US009912562B2

(12) United States Patent
Callahan et al.

(10) Patent No.: US 9,912,562 B2
(45) Date of Patent: Mar. 6, 2018

(54) MEASURING LATENCY IN AN INTERACTIVE APPLICATION

(71) Applicant: Microsoft Technology Licensing, LLC, Redmond, WA (US)

(72) Inventors: Sean Callahan, White Bear Lake, MN (US); Ian Kelly Latham, Redmond, WA (US); Charles T. Lenzmeier, Woodinville, WA (US); Anil Ingle, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

(21) Appl. No.: 14/230,340

(22) Filed: Mar. 31, 2014

(65) Prior Publication Data
US 2015/0281029 A1    Oct. 1, 2015

(51) Int. Cl.
| H04L 12/26 | (2006.01) |
| H04L 29/08 | (2006.01) |
| H04L 29/06 | (2006.01) |
| A63F 13/355 | (2014.01) |
| A63F 13/358 | (2014.01) |
| A63F 13/335 | (2014.01) |
| A63F 13/53 | (2014.01) |
| A63F 13/77 | (2014.01) |

(52) U.S. Cl.
CPC ........ *H04L 43/0864* (2013.01); *A63F 13/335* (2014.09); *A63F 13/355* (2014.09); *A63F 13/358* (2014.09); *H04L 29/06034* (2013.01); *H04L 67/10* (2013.01); *A63F 13/53* (2014.09); *A63F 13/77* (2014.09)

(58) Field of Classification Search
CPC ............................. H04L 43/0864; H04L 67/10
USPC ................................................... 709/223–226
See application file for complete search history.

(56) References Cited

U.S. PATENT DOCUMENTS

| 7,133,806 | B2 * | 11/2006 | Prasad ................ G06F 11/3419 |
| | | | 702/186 |
| 7,555,549 | B1 * | 6/2009 | Campbell ........... H04L 12/6418 |
| | | | 709/223 |
| 2002/0137564 | A1 * | 9/2002 | Kawazu .................. A63F 13/10 |
| | | | 463/43 |
| 2002/0142843 | A1 | 10/2002 | Roelofs |

(Continued)

FOREIGN PATENT DOCUMENTS

EP    1949943 A1 *    7/2008    ............. A63F 13/12

OTHER PUBLICATIONS

Chen, et al., "On the Quality of Service of Cloud Gaming Systems", In IEEE Transactions on Multimedia, vol. 16, Issue 2, Feb. 1, 2014, pp. 480-495.

(Continued)

*Primary Examiner* — Minh-Chau Nguyen
(74) *Attorney, Agent, or Firm* — Workman Nydegger (57) ABSTRACT

Embodiments are directed to determining latency in an interactive application. In one scenario, a computer system generates an indication that an input has been triggered. This indication identifies the input. The computer system sends the indication to an interactive application that receives and accesses the indication. The computer system further receives an output from the interactive application that includes an indication of the input, and determines an amount of latency between the sending of the generated indication and the receiving of the interactive application output.

25 Claims, 7 Drawing Sheets

(56) References Cited

U.S. PATENT DOCUMENTS

| | | | | |
|---|---|---|---|---|
| 2006/0247056 | A1* | 11/2006 | Luckerson | A63F 3/00 463/42 |
| 2008/0120592 | A1* | 5/2008 | Tanguay | G06F 9/4881 717/104 |
| 2009/0215538 | A1* | 8/2009 | Jew | A63F 13/12 463/42 |
| 2010/0022302 | A1 | 1/2010 | Iwakiri et al. | |
| 2010/0166065 | A1 | 7/2010 | Perlman et al. | |
| 2011/0078532 | A1* | 3/2011 | Vonog | G06F 3/1454 715/733 |
| 2012/0147031 | A1* | 6/2012 | Luengen | G06F 8/38 345/619 |
| 2012/0289296 | A1* | 11/2012 | Marty | G06K 9/00342 463/3 |
| 2013/0132510 | A1 | 5/2013 | Ye et al. | |
| 2013/0185038 | A1* | 7/2013 | Radu | G06F 11/3447 703/2 |
| 2013/0288794 | A1* | 10/2013 | Ando | A63F 13/69 463/31 |
| 2014/0143692 | A1* | 5/2014 | Wigdor | G06F 3/0488 715/764 |
| 2015/0281029 | A1* | 10/2015 | Callahan | H04L 43/0864 709/224 |
| 2016/0112292 | A1* | 4/2016 | Ahuja | H04L 67/1097 709/212 |

OTHER PUBLICATIONS

"International Search Report and Written Opinion Issued in PCT Application No. PCT/US2015/022598", dated Jan. 13, 2016, 20 Pages.

Lee, et al., "Are All Games Equally Cloud-Gaming-Friendly? An Electromyographic Approach", In Proceedings of the 11th Annual Workshop on Network and Systems Support for Games, Article No. 3, Nov. 22, 2012, 6 Pages.

"International Preliminary Report on Patentability Issued in PCT Application No. PCT/US2015/022598", dated Jul. 11, 2016, 15 Pages.

"Second Written Opinion Issued in PCT Application No. PCT/US2015/022598", dated May 17, 2016, 7 Pages.

Chen, et al., "Measuring the Latency of Cloud Gaming Systems", In Proceedings of the 19th ACM International Conference on Multimedia, Nov. 28, 2011, 4 pages.

Vankeirsbilck, et al., "Platform for Real-time Subjective Assessment of Interactive Multimedia Applications", In Proceedings of Multimedia Tools and Applications, Feb. 2013, 22 pages.

Spracklen, et al., "Comprehensive User Experience Monitoring", In Vmware Technical Journal, Mar. 2012, 23 pages.

* cited by examiner

MEASURING LATENCY IN AN INTERACTIVE APPLICATION

BACKGROUND

Computer systems typically include hardware that allows communication over wired or wireless networks. These networks allow computer users to communicate with each other or with other software applications. In many cases, the data is transmitted between a server and a client computer system. This communication may be performed asynchronously (as with email), or synchronously (as with chat). Synchronous communication between computer systems allows data to be streamed between computer systems. This streaming data may include video, audio, text or other types of data.

BRIEF SUMMARY

Embodiments described herein are directed to determining latency in an application and, more specifically, to determining latency in an interactive gaming application. In one embodiment, a computer system generates an indication that an input has been triggered. This indication identifies the input. The computer system sends the indication to an application that receives and accesses the indication. The computer system further receives an output from the application that includes an indication of the input, and determines an amount of latency between the sending of the generated indication and the receiving of the application output.

In another embodiment, a computer system accesses an indication indicating that an interactive input has occurred. The computer system determines that an output has been generated by an interactive application and that the generated output was generated after accessing the indication. The computer system generates a correlating output that correlates an identifier that was included in the indication with the generated output. The correlated output includes the generated output and an indication of the identified interactive application input. The computer system also sends the correlating output to a specified entity such as a user or other computer system.

In yet another embodiment, a computer system determines latency in an interactive gaming application. The computer system accesses an indication indicating that an interactive gaming application input has occurred. The computer system determines that a frame corresponding to a video game has been generated by the interactive gaming application, and that the frame was generated after accessing the indication. Still further, the computer system generates a correlating output that correlates the frame with an identifier that was included in the indication. The correlating output includes the frame and an indication of the identified interactive gaming application input. The computer system then sends the correlating output to a specified entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to determining latency in an interactive application and to determining latency in an interactive gaming application. In one embodiment, a computer system generates an indication that an input has been triggered. This indication identifies the input. The computer system sends the indication to an interactive application that receives and accesses the indication. The computer system further receives an output from the interactive application that includes an indication of the input, and determines an amount of latency between the sending of the generated indication and the receiving of the interactive application output.

In another embodiment, a computer system accesses an indication indicating that an interactive application input has occurred. The computer system determines that an output has been generated by the interactive application and that the generated output was generated after accessing the indication. The computer system generates a correlating output that correlates an identifier that was included in the indication with the generated output. The correlated output includes the generated output and an indication of the identified interactive application input. The computer system also sends the correlating output to a specified entity such as a user or other computer system.

In yet another embodiment, a computer system determines latency in an interactive gaming application. The computer system accesses an indication indicating that an interactive gaming application input has occurred. The computer system determines that a frame corresponding to a video game has been generated by the interactive gaming application, and that the frame was generated after the interactive application has accessed the indication. Still further, the computer system generates a correlating output that correlates the frame with an identifier that was included in the indication. The correlating output includes the frame and an indication of the identified interactive gaming application input. The computer system then sends the correlating output to a specified entity.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
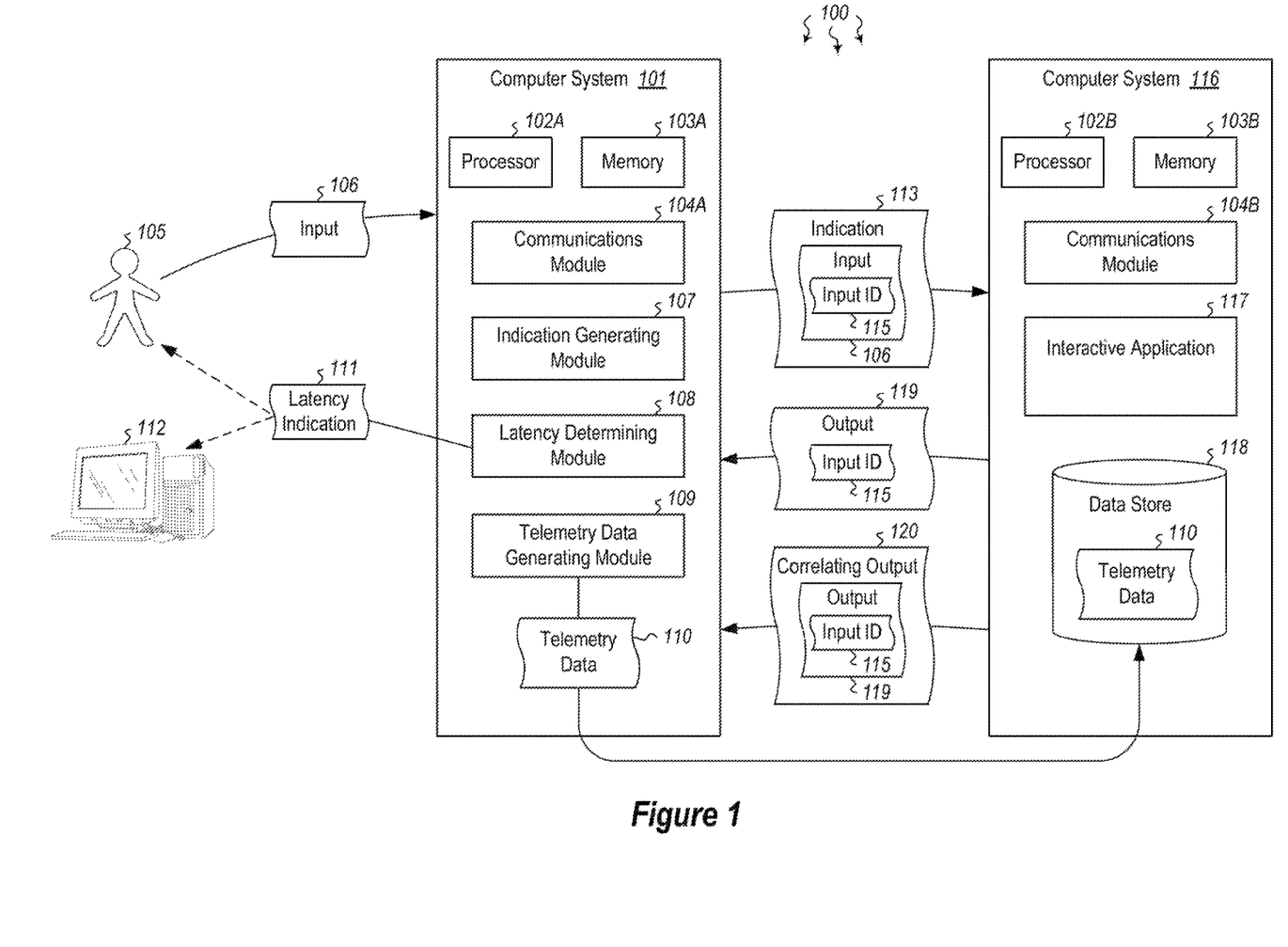
FIG. 1 illustrates a computer architecture in which embodiments described herein may operate including determining latency in an interactive application.

As illustrated in FIG. 1, a computing system 101 typically includes at least one processing unit 102A and memory 103A. The memory 103A may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103A of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103A. The system memory may also be referred to as "main memory", and includes memory locations that are addressable by the at least one processing unit 102A over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer systems 101 and 116 may be any type of local or distributed computer systems, including cloud computing systems. Each includes at least one processor 102A/102B, memory 103A/103B and a communications module 104A/104B. The communications module may include wired or wireless communication means including wired or wireless network cards, Bluetooth wireless radios, Wifi radios or other hardware configured to transmit and/or receive digital data. The communications module 104A, for example, may receive input 106 from user 105 and pass that input on to the communications module 104B of computer system 116.

In some cases, the input 106 received from user 105 may be sent to or otherwise accessed by indication generating module 107. The indication generating module 107 may generate indications such as 113. The indications may indicate information to other entities such as computer system 116. For instance, indication 113 may indicate that an input 106 has been received at computer system 101. The indication may further include an input identifier 115 for the input 106. The input identifier 115 may uniquely identify a single input (such as button press, mouse click, keyboard input or other input) or may identify the state of an input device at a given point in time.

Figure 5:
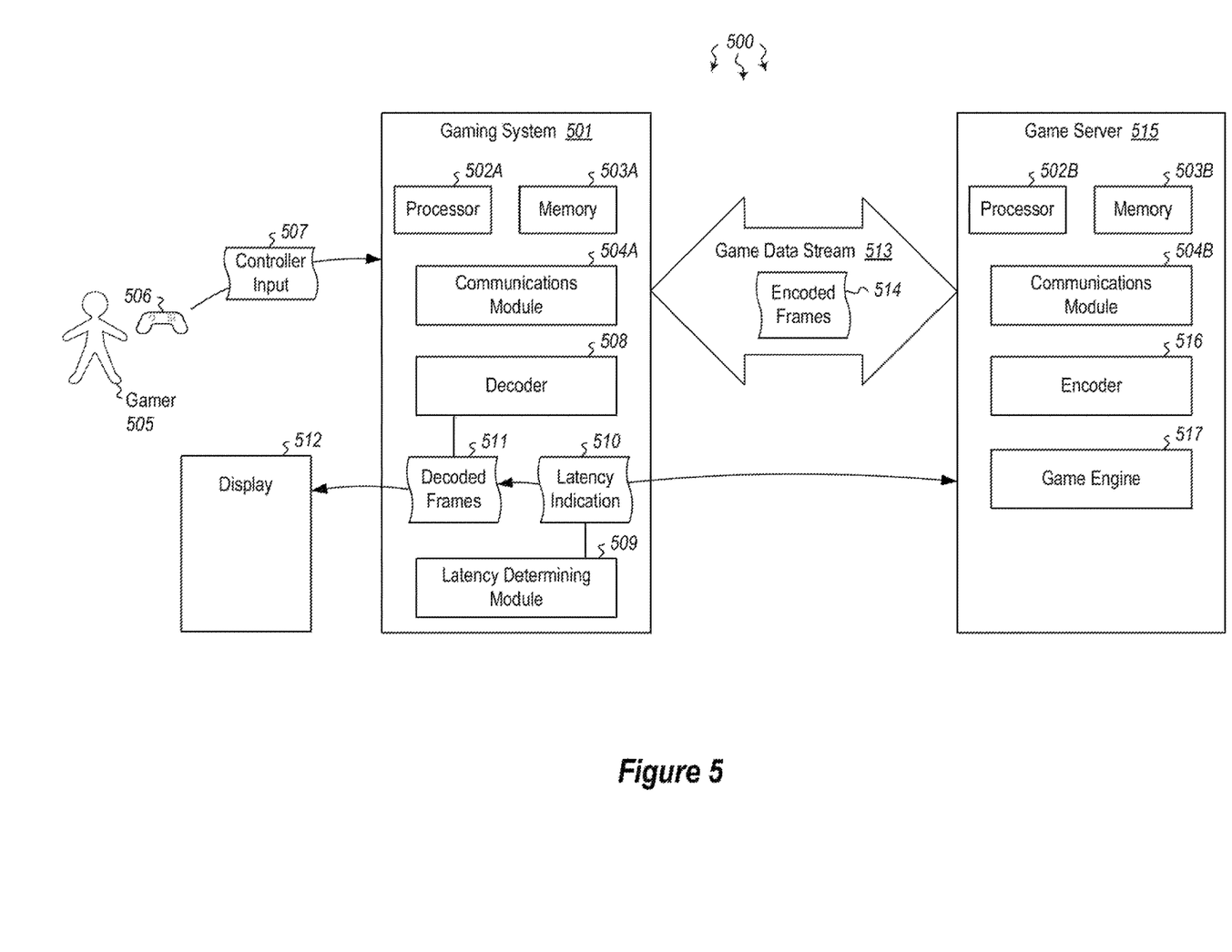
FIG. 5 illustrates an embodiment in which latency is determined for a streamed video game.

For example, in cases where user 105's input 106 is provided via a game controller (as generally shown in FIG. 5), the input may include a general indication of the state of each button, trigger, joystick, motion sensor output or other controller feature at a given point in time. This indication of controller state may be provided to the computer system 101 at a regular basis, in some cases many times each second. Thus, the input ID 115 may be specific to a current state indication of an input device such as a controller. This input ID 115 may be incremental and may increase sequentially (e.g. in embodiments where the input ID comprises a timestamp regulated by a clock) or in some other manner. The indication 113, including input 106 and input ID 115, is thus sent from computer system 101 to computer system 116.

The indication 113 may be received by communications module 104B or may be received directly by interactive application 117. The interactive application 117 may be any type of software application, service or other software functionality. The interactive application 117 may be configured to provide functionality that allows a user (e.g. 105) to interact with it. For example, the interactive application may be a streaming application that provides streamed content to a user. This streamed content may include video, audio, gaming and/or other content. The interactive application 117 may also provide virtual private network (VPN) functionality, which may, for example, provide access to applications available over the VPN. Still further, the interactive application may be a word processing, spreadsheet, calendaring or other personal information management application that allows users to update and make changes to documents, spreadsheets, calendars, emails or other items. Thus, as will be understood by one skilled in the art, the interactive application 117 may provide many different types of functionality. For simplicity's sake, the interactive application 117 will often be described herein as a gaming application. However, as mentioned, it can be substantially any type of application.

Upon receiving indication 113 and input 106, the interactive application 117 performs some type of processing on (or in response to) the input. In the context of a streaming video game, the interactive application 117 may generate an output 119 such as a frame that includes gaming content. The output also includes an indication of the input ID 115. In some cases, the input ID 115 in the output 119 may be identical to that received in the input 106, or it may differ in some manner and yet still uniquely identify the input 106. In some cases, the output 119 and the input ID 115 may be correlated together into a correlating output 120 which is sent by the interactive application 117 to the computer system 101.

The communications module 104A of the computer system 101 may receive the output 119 (either singly, or as part of correlating output 120) and pass it to the latency determining module 108. The latency determining module 108 may be configured to determine the amount of latency involved between the time the input 106 is received and the time the application output 119 is received. More specifically, the latency determining module 108 may determine the amount of latency between the time when a specific input 106 is provided by the user 105 and when the first frame that is causally connected to that input is generated by the interactive application 117 and received at the computer system 101.

The latency determining module 108 may determine end-to-end latency and/or may determine latency for each stage in the process (e.g. from button push to arrival at computer system 101, from computer system 101 to interactive application 117, from the interactive application to computer system 101 and/or from computer system 101 to the output display (e.g. a TV or computer monitor). Once the amount of latency has been determined (either per-stage or end-to-end), an indication 111 indicating the amount of determined latency is sent to user 105, to another computer system (e.g. 112) or to another entity.

The latency indication 111 may, in some cases, be incorporated into other telemetry data 110 generated by the telemetry data generating module 109. This telemetry data may include many different measurements and indications of network speeds, processing times, data traffic flow, current bottlenecks, number of current users, current processor load and other types of information. The telemetry data 110 may be sent to users for analysis and/or stored in a data store 118. While shown as being within computer system 116, it will be understood that data store 118 may be located within computer system 101, within some other computer system, or may be stand-alone storage, or may be part of a distributed storage system (e.g. a storage area network). The data store 118 may store a variety of different information including telemetry data 110, inputs 106 and corresponding input IDs 115, and latency indications 111.

These latency determinations may be made periodically at specified intervals. The latency may be constantly changing based on network or other conditions. For example, when streaming a video game, the game frames may encode or decode at different rates, inputs may be received on time or late, server response times may vary with load, or other conditions may contribute to additional latency. Embodiments herein are designed to measure latency programmatically and identify which parts of the data streaming pipeline the latency is coming from. Once the source(s) of the latency is/are determined, engineers or other users may determine how to reduce the latency by concentrating on its most consistent sources.

Thus, at least in some embodiments, the generation and consumption of user inputs are tracked through each step of the data streaming pipeline, and programmatically prove a causal link between the inputs and the frames that are encoded and decoded. As such, real-time latency can be measured during real-world data streaming scenarios (such as during active gameplay). The association of additional measurements taken within the pipeline with those same inputs and corresponding output frames provides the ability to determine the latency for each sub-stages of the pipeline as well as the latency of the entire pipeline. The latency data may then be added to a telemetry stream that may be uploaded to a service for offline analysis. Embodiments described herein thus allow automated latency measurements from real user traffic during real data streaming scenarios, and further allow runtime configuration of verbosity level to provide more or less latency or telemetry detail. Still further, embodiments are configured to operate across the internet in production datacenters with real customers, and are configured to detect many sources of latency in customer experience, including network, decode, encode, and hardware-related sources of latency.

Figure 7:
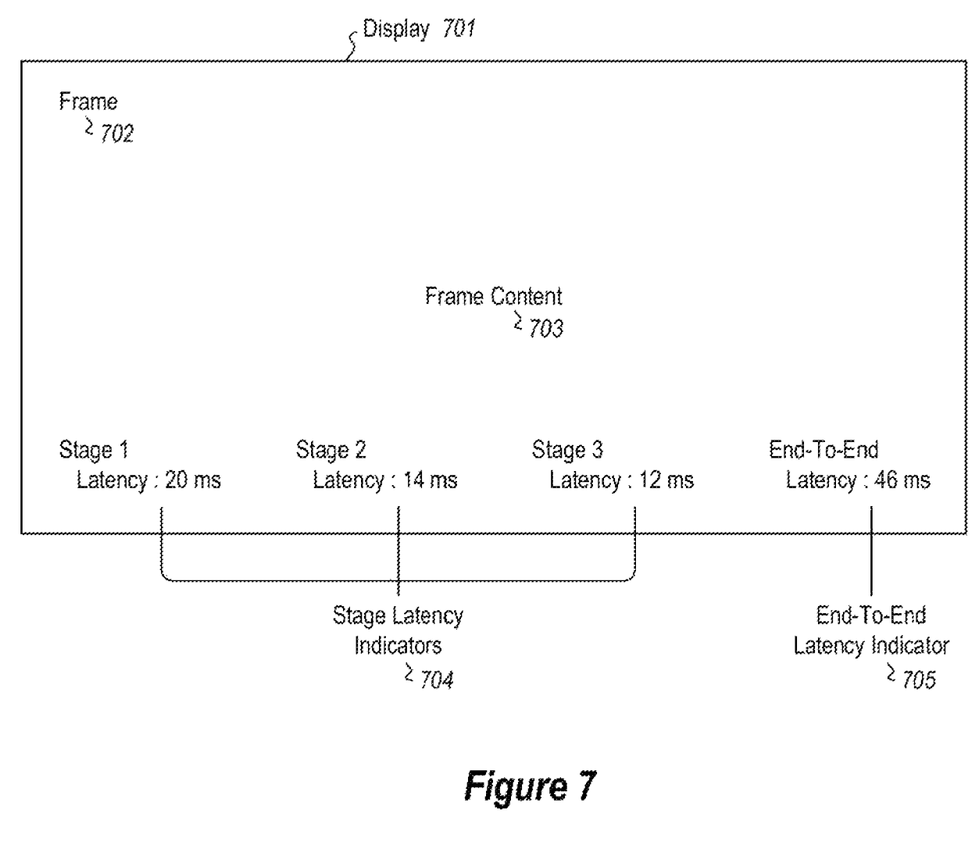
FIG. 7 illustrates an embodiment in which a displayed frame includes indications of stage-specific latency and end-to-end latency.

In some embodiments, computer system 101 may be a client-side computer system. The client may generate an input identifier 115 for each input 106 that is scanned on the client, and pass that input ID 115 to the interactive application 117 along with the input 106. The client identifies the time when the input was scanned. When the input reaches the computing system 116, the input is passed to the underlying operating system (OS) running on that computer system. When computer system 116's video encoding hardware captures a new frame to send to the client, it may generate a frame identifier for that frame, and may ask the operating system running on the client which input was most recently consumed before the frame that it is about to encode was captured. Here, it should be noted, the input may be consumed by the interactive process that generates the frame on computer system 116, or by the operating system of computer system 116, or by another software component on computer system 116 that handles the input before the interactive application 117 accesses that input. The generated input ID 115 then gets sent back to the client with that encoded frame, where the client can determine the amount of time it took to go from scanning the input to finishing the decoding of the frame that was the first possible frame to contain any effects (i.e. causal results) generated by that input. These timings are logged by the telemetry data generating module 109 for reporting after the data streaming session is complete. The timing data may also be made available for real-time display in the client (as generally shown in FIG. 7) to help users understand how much latency is impacting their experience.

Additional events may also be logged with timestamps into a telemetry stream, which may be sent to one or more specified entities. Those events may each contain the relevant input ID and frame ID. With those events, embodiments described herein may reconstruct the time required for the data streaming pipeline to process each frame and input in a session with various levels of granularity (e.g. by specifying the level of verbosity). This allows those portions of the pipeline where latency is highest to be identified and targeted for systematic improvements, and allows changes to be tracked over time to identify when changes have been made that adversely affect the system. The above concepts will be explained further below with regard to methods 200, 300 and 400 of FIGS. 2, 3 and 4, respectively.

Figure 2:
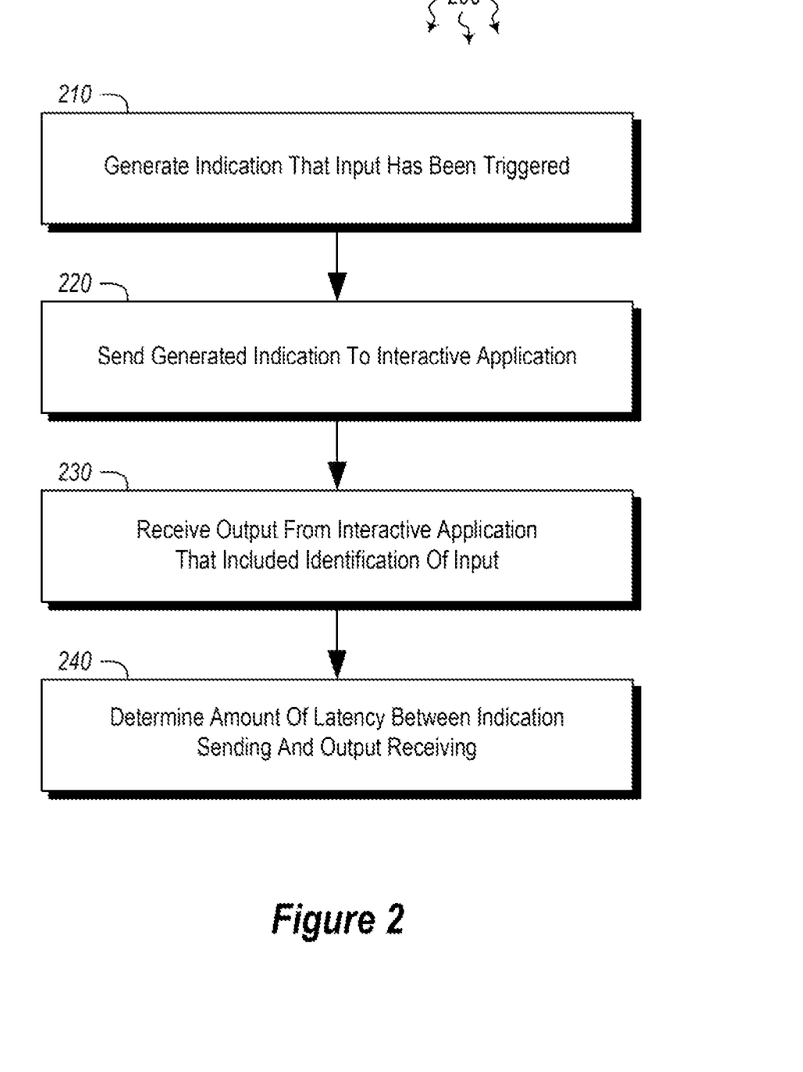
FIG. 2 illustrates a flowchart of an example method for determining latency in an interactive application.
Figure 3:
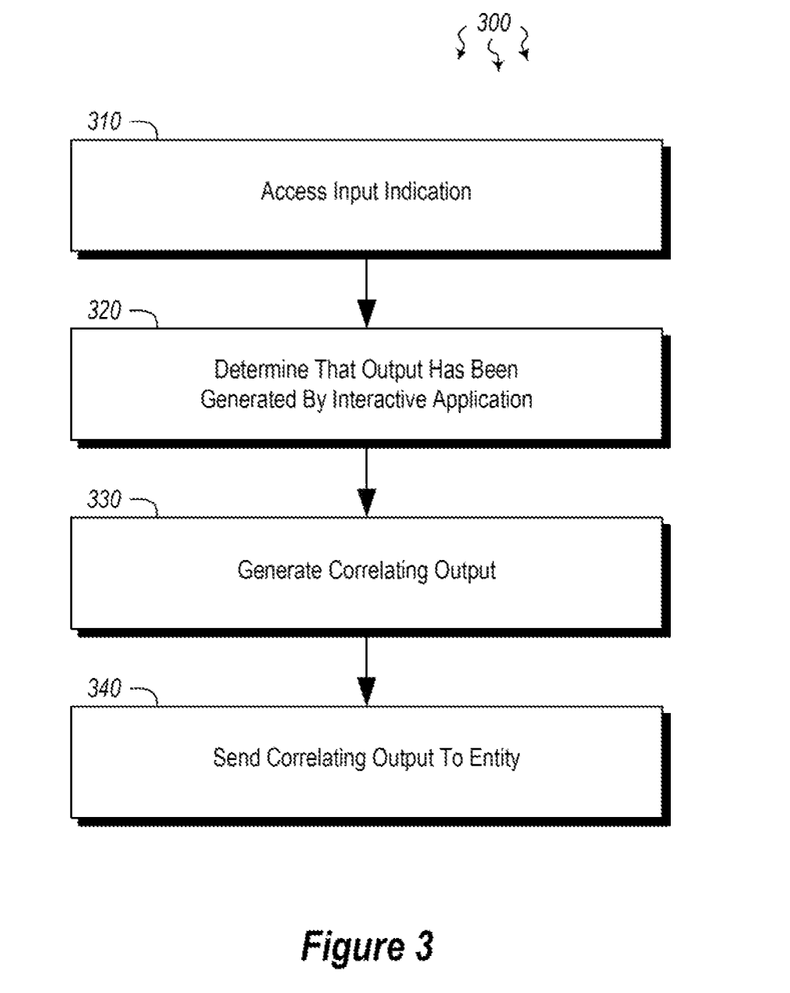
FIG. 3 illustrates a flowchart of an alternative example method for determining latency in an interactive gaming application
Figure 4:
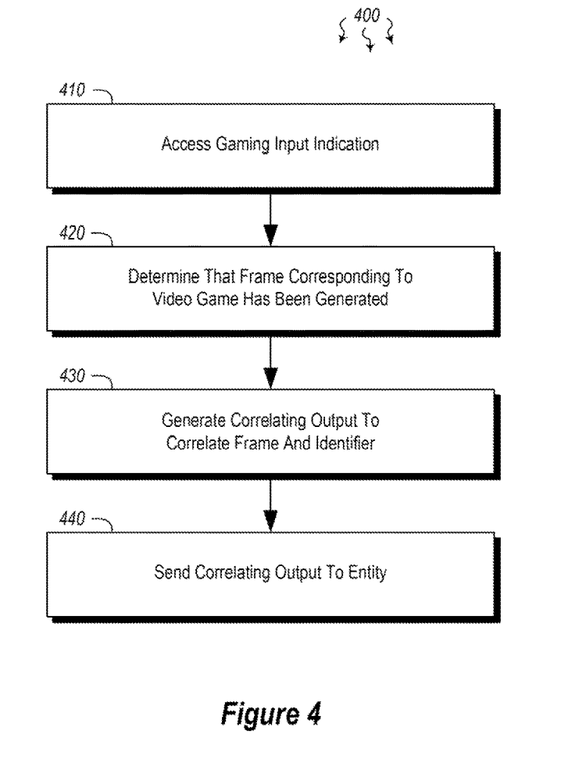
FIG. 4 illustrates a flowchart of an example method for determining latency in an interactive gaming application.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining latency in an interactive application. The method 200 will now be described with frequent reference to the components and data of environment 100 of FIG. 1.

Method 200 includes an act of generating an indication that at least one input has been triggered, the generated indication identifying the at least one input (act 210). For example, indication generating module 107 may generate indication 113 indicating that input 106 has been triggered. The indication 113 includes an input identifier 115 that (uniquely) identifies the input. As mentioned above, the input may be a single input such as a button press, the input may be multiple inputs such as a joystick movement and a button press, or it may be an indication of an input device's state at a given moment in time.

For example, a video game controller includes many different buttons and input devices including joysticks, track pads, audio inputs, motion detectors and other means of providing inputs. The input 106 may, for example, include a series of integer values that indicate the current state of each input device on the controller. This series of integer values may be transmitted wirelessly (or via a wired connection) in data packets. These data packets (e.g. user datagram protocol (UDP) packets, transmission control protocol/internet protocol (TCP/IP) packets or other types of data packets) may then be received by computer system 101 as a stream of inputs which may be collectively referred to as input 106. These inputs may be received during a data streaming session (e.g. during gameplay for a streamed video game). Each data packet may include a timestamp indicating when the state of the controller or other input device was determined. In some embodiments, it may be desirable to test the latency of a streaming application such as a video game. In such cases, an actual game controller may be used to provide the inputs, or, in other cases, a simulated video game controller signal may be used. A simulated signal may allow testers to eliminate any latency variables that exist with input devices, and allow for a more controlled testing environment.

Method 200 next includes an act of sending the generated indication to an interactive application that consumes the generated indication (act 220). The communications module 104A of computer system 101 may send indication 113 to interactive application 117 which receives and implements the input 106 received in the indication. In some cases, it should be noted, messages such as indication 113 are sent from an operating system down to an application such as application 117. This may be due to the application's subscription to a message loop where changes are delivered by the OS. In other cases, the OS may hold the current state of the input device in memory, updating the state at some frequency as it is informed of changes by the driver at the driver level. The game engine (e.g. 517 of FIG. 5) may then request and receive the current input device state from the OS. As such, an indication of user input may be received from a client computer system or may be received from an internal operating system function that is continually updated based on input from the client computer system (e.g. 101).

The interactive application 117 performs processing based on the input and generates some type of output 119 which is sent to computer system 101. The output may be a video frame, it may be an update to a word processing document or other type of output, based on which type of functionality the interactive application is configured to provide. The communications module 104A of computer system 101 then receives the output 119 from the interactive application in act 230. The output includes an indication of the input 106. The indication may be the same input ID 115 that was initially sent by the computer system 101, or may be a different identifier that identifies the input 106. Upon receiving the output 119 and the identification of the input 106, the latency determining module 108 may determine an amount of latency between the sending of the generated indication 113 and the receiving of the interactive application output 119 (act 240).

Figure 6:
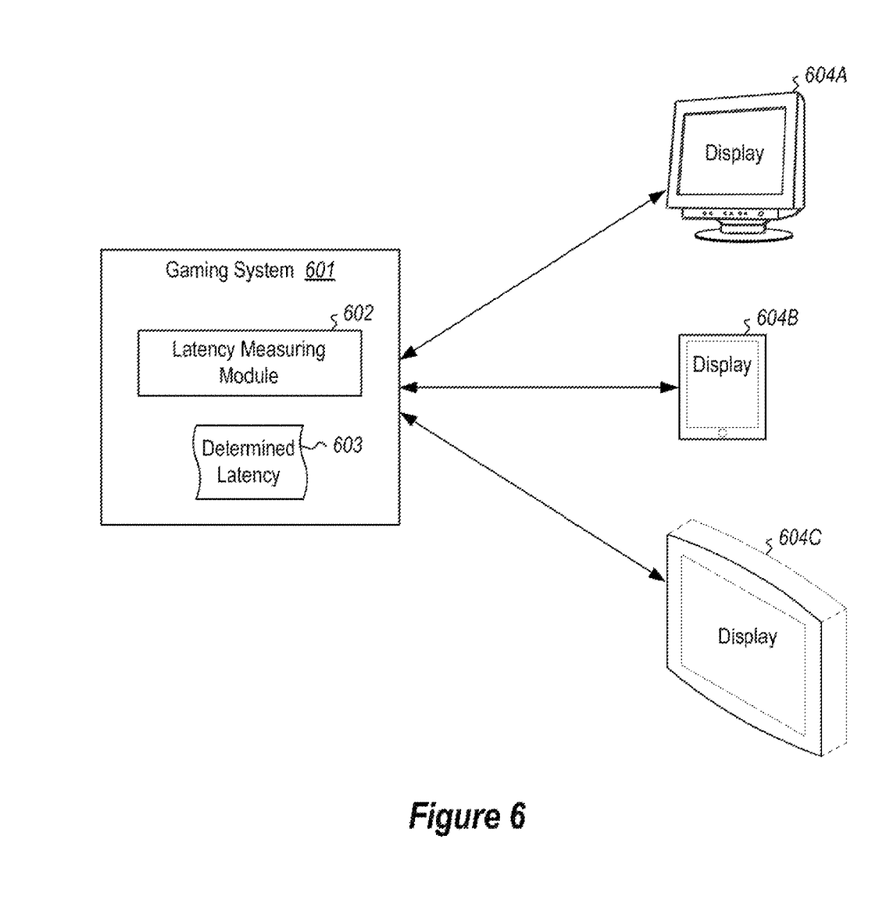
FIG. 6 illustrates an embodiment in which latency is determined relative to a variety of different display devices.

As shown in FIGS. 6 and 7, the latency indication 111 as output by the latency determining module 108 may include a stage latency, and/or may include an end-to-end latency. The stages may include the amount of time taken by frame capture, frame encoding, frame decoding, frame packetization, audio capture, audio encoding, audio decoding, time to send (some or all) frame packets off the encoder, time to receive (some or all) packets for a given frame on the decoder, or other processes. These stages may vary in granularity to show segments between processes, or time segments within a process (e.g. an encoding process), etc. FIG. 7 illustrates stage latency indicators 704 for stages 1, 2 and 3. In the embodiment shown in FIG. 7, stage 1 has a latency of 20 ms, stage 2 has a value of 14 ms and stage 3 has a value of 12 ms. Thus, in this example, the end-to-end latency 705 would be the sum of the stage latencies, for a total of 46 milliseconds.

As shown in FIG. 6, various types of displays may be used to display the interactive applications 117's output 119. Display 604A is a liquid crystal display (LCD) television, while display 604B is a tablet computing system and 604C is a plasma television. Each of these displays may have a different latency associated with them. That is, each display may take a longer or shorter time to display input once it is received. The latency determining module 602 of gaming system 601 may thus determine which display is used to display the interactive application (e.g. display 604A) and, based on that display, may further determine the amount of latency 603 between the sending of the generated indication (113 of FIG. 1), the receiving of the interactive application output (119), and the display of interactive application content on the display 604A. In this manner, the end-to-end latency may take into account the latency of the actual display itself. The end-to-end latency measurement, as well as the stage measurements may be displayed in real-time on a display (e.g. during gameplay). In FIG. 7, a display 701 displays a frame 702 that includes frame content 703, which may include gaming content associated with a video game. On the bottom of the display (or in another part), an indication of latency may be displayed for each stage (704) and for an end-to-end measurement (705). These latency measurements may be continually updated in real-time, so that users viewing the display may be continually apprised as to the latency status for each stage.

In some embodiments, computer system 101 may be configured to monitor latency indefinitely or for a specified period of time. The computer system may determine when changes have been made to communication networks, to encoders, to processing loads, to the interactive application 117 itself, or when other changes have been made. Based on these changes, the computer system 101 may indicate whether the changes adversely affected the measured latency, either in a stage or in the end-to-end total. The computer system 101 may also monitor system changes to assist in generating telemetry data. As mentioned above, telemetry data may indicate various time or latency measurements for different stages of the data streaming process, including sending the input to computer system 116 and receiving the output 119 from computer system 116. The telemetry data generating module 109 may generate telemetry data 110 during the processing of an application (e.g. during gameplay) and send that data to other computer systems for processing, and/or store the telemetry data in a data store 118. This telemetry data may be analyzed over time to make improvements to the data streaming process in each stage.

FIG. 3 illustrates a flowchart of a method 300 for determining latency in an interactive application. The method 300 will now be described with frequent reference to the components and data of environment 100 of FIG. 1.

Method 300 includes an act of accessing an indication indicating that an interactive application input has occurred, the indication including an identifier (act 310). For example, computer system 116 may access indication 113 which includes input 106 and input ID 115. As mentioned above, the input may be a single input, multiple inputs or a stream of input state indications. The computer system 116 may then determine that an output has been generated by the interactive application and that the generated output was generated after accessing the indication (act 320). The interactive application 117 may, for instance, generate output 119 after receiving input 106. In the case of a video game, the output may comprise a frame with encoded video game content. The computer system 116 may combine the output 119 and the input ID 115 in a correlating output 120. Indeed, as shown in method 300, the computer system 116 generates correlating output 120, which correlates the identifier 106 included in the indication 113 with the generated output 119 (act 330). As such, the correlating output 120 includes the generated output 119 and an indication of the identified interactive application input. This indication may be the received input ID 106, or may be a separate indication that identifies the input 106.

Method 300 further includes an act of sending the correlating output to a specified entity (act 340). The communications module 104B of computer system 116 may send the correlating output 120 to computer system 101, to a different computer system (112), to user 105 and/or to other locations or entities. In some cases, the correlating may include tagging the generated output 119 with a timestamp. Thus, in such cases, the correlating output 120 would include the interactive application output 119, an input identifier 115 and a timestamp tag. The timestamp tag may increment with each output, and may be used in determining latency. Indeed, timestamps on the input 106 and output 119 may be used to determine which input causally resulted in the generation of an output. A user's inputs may be continually scanned and tagged with an identifier (e.g. a timestamp) which stays with the input throughout processing of the output. This identifier 115 is then used, along with a timestamp tag on the output, by the latency determining module 108 to determine the latency between the user's input and the first output that is causally linked to the input (i.e. the first output to include the input's effect).

In some embodiments, as will be explained further below with regard to method 400 and FIG. 5, the output of the interactive application is a frame corresponding to a video game. The frame may be sent from the interactive application to an encoder for encoding. The encoding allows the frame to be transmitted in an efficient (i.e. bandwidth-sensitive) manner, where it can then be decoded by a receiving computer system and displayed. The latency determining module 108 may be configured to determine latency between a gaming input and a game engine output (e.g. an encoded or non-encoded frame). Indeed, in some cases, the interactive application output 119 may be a preliminary output that receives subsequent processing (such as encoding) before being sent to the specified entity. In order to determine the latency between the user's input and the first causally connected video frame, the input and the input's consumption is tracked throughout the processing pipeline, including its arrival at the gaming console (e.g. computer system 101), its arrival and processing at the game streaming server (e.g. computer system 116) and its transmission back to the gaming console. In this manner, the user's input is tagged and tracked at the lowest level throughout transmission and processing.

Turning now to FIG. 4, a flowchart is illustrated of a method 400 for determining latency in an interactive gaming application. The method 400 will now be described with frequent reference to the components and data of environments 100 of FIGS. 1 and 500 of FIG. 5.

Method 400 includes an act of accessing an indication indicating that an interactive gaming application input has occurred, the indication including an identifier (act 410). For example, game server 515 may access indication 113 sent over the game data stream 513. As with the computer systems of FIG. 1, gaming system (e.g. a gaming console) 501 and game server 515 may each include processors 502A/502B, memory 503A/503B and communications modules 504A/504B. The communications modules may send and receive data over wired or wireless communication channels, including game data stream 513. The game data stream may include any of the data elements sent in FIG. 1, and may further include encoded frames 514 sent from the game server 515 to the gaming system 501. As with the embodiments described above, the indication 113 may include input 106 and input ID 115. The game server 515 may determine that a frame corresponding to a video game has been generated by the interactive gaming application, and that the frame was generated after accessing the indication (act 420).

In some embodiments, the game server 515 may be a distributed (e.g. cloud) server that receives inputs from many thousands or millions of gamers and provides a streaming gaming experience to those gamers (e.g. 105). The game server 515 may include a game engine 517 for each game, or a game engine that works with multiple different games, or both. The game engine may receive the gamer's controller 506 input 507 via the game data stream 513 and perform game-related processing on that input. In the case of a first-person shooter game, the user's input 507 may include a joystick input indicating that the user is looking left and firing their gun. The game engine receives this input and determines how to generate an appropriate frame (or series of frames) to animate the user's input. This output is then sent to an encoder 516 for encoding the frame (or series of frames).

The game server 515 may generate a correlating output that correlates the (encoded) frame 514 with the identifier 115 included in the indication 113, the correlating output including the frame and an indication of the identified interactive gaming application input (act 430). This correlating input is then sent to a specified entity (act 440). Thus, the correlating output 120 may include an encoded frame 514 as output 120, along with an indication of the input (e.g. input ID 115).

The correlating output allows the latency determining module 509 to determine stage latencies and/or end-to-end latency. Because the user's input 507 is tracked from the time it leaves the controller 506 (or is polled from the controller), the latency determining module knows when the input occurred and when the first frame to include the effects of the input was generated. The latency determining module 509 further knows the amount of time spent in transmission and processing. From this information, the latency determining module 509 can determine the latency at each stage in the game streaming process, as well as the end-to-end latency. This may include time taken by the decoder 508 to decode the frames 511 and to display the frames on display 512. In some embodiments, the frame is in h.264 format (or in some other format). The input ID and associated latency (i.e. telemetry) data 110 may be bundled with the frame data or may be sent over a different channel. Moreover, input ID and latency data may be sent without a video update in cases where the user's input triggered an audio-only output, and no frame change is necessary.

By tracking the input through the frame generation, encoding, decoding and transfer between computer systems, the latency determining module 509 can determine the first frame generated by the game engine to include at least a portion of video game content that is the causal result of the triggered input. The first causally-linked frame can be determined by looking at when a video game's API call came asking for controller input. Once the game has consumed the input, the next frame generated by the game engine is the causally-linked frame. Using this causally-linked frame, a true determination of latency can be made between the controller input and its intended effect and ultimate display on the user's monitor or tv. This determination of latency 510 can be displayed to the gamer 505 and/or can be sent to other computer systems for analysis. In this manner, latency can accurately be determined for a streaming video game or for another interactive application.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer program product for implementing a method for determining latency in an interactive application, the computer program product comprising one or more computer-readable storage media having stored thereon computer-executable instructions that are executable by one or more processors of a computing system to cause the computing system to perform the method, the method comprising:
    an act of generating an indication that at least one input has been triggered, the generated indication identifying the at least one input;
    an act of sending the generated indication to an interactive application that consumes the generated indication;
    an act of receiving an output from the interactive application, the output including a second indication of the at least one input;
    an act of determining an amount of latency between the sending of the generated indication and the receiving of the interactive application output;
    an act of displaying, on a display of the computing system, both a numerical measurement of the amount of latency and at least a portion of the interactive application output, wherein the numerical measurement of the amount of latency is displayed simultaneously with the displayed portion of the interactive application output, and
    an act of adjusting, during a runtime of the interactive application, how much latency detail is acquired between the sending of the generated indication and the receiving of the interactive application output, whereby the method enables a runtime configuration of a verbosity level that alters how much latency detail is acquired.

2. The computer program product of claim 1, wherein the generated indication is generated in response to a received input signal from a video game controller.

3. The computer program product of claim 2, wherein the input signal received from the video game controller is received during gameplay.

4. The computer program product of claim 3, the method further comprising:
    an act of generating one or more portions of telemetry data during gameplay, the one or more portions of telemetry data comprising time measurement data corresponding to at least one of the interactive application output or the at least one input; and
    an act of performing at least one of the following:
        an act of storing the one or more portions of telemetry data in a data store; or
        an act of sending the one or more portions of telemetry data to a second computer system for analysis.

5. The computer program product of claim 2, wherein the received input signal comprises at least one of an actual video game controller signal and a simulated video game controller signal.

6. The computer program product of claim 1, wherein the interactive application comprises a video game application, and wherein the interactive application output comprises a video game output.

7. The computer program product of claim 6, wherein the video game output comprises a frame.

8. The computer program product of claim 7, wherein the frame includes at least a portion of video game content that is a causal result of the at least one triggered input.

9. The computer program product of claim 1, further comprising:
    an act of monitoring the determined amount of latency over a period of time to determine how one or more applied changes impact the determined amount of latency.

10. The computer program product of claim 1, the method further comprising:
    an act of determining which display is used to display the interactive application output; and
    based on the determined display, determining a second amount of latency, the second amount of latency being based on the sending of the generated indication, the receiving of the interactive application output, and the display of interactive application output on the display.

11. The computer program product of claim 1, wherein the numerical measurement of the amount of latency is displayed in real-time and is continually updated.

12. The computer program product of claim 1, wherein the determined amount of latency comprises at least one of an end-to-end latency and a stage-specific latency.

13. The computer program product of claim 1, wherein the method further includes an act of generating telemetry data, the telemetry data including an indication of: network speed, data traffic flow, current bottlenecks, a number of current users, and a current processor load.

14. The computer program product of claim 1, wherein the method further includes:
    an act of identifying one or more parts of a data stream pipeline that are contributing to the amount of latency.

15. The computer program product of claim 1, wherein the method further includes:
    an act of monitoring the amount of latency for only a specified period of time; and
    refraining from monitoring the amount of latency after the specified period of time.

16. The computer program product of claim 1, wherein the amount of latency that is displayed on the display corresponds to an end-to-end latency, and wherein the method further includes:
an act of displaying, on the display of the computing system, a different numerical measurement, the different numerical measurement corresponding to a stage latency, whereby the stage latency, the end-to-end latency, and the at least the portion of the interactive application are all displayed simultaneously with each other.

17. A computer system comprising the following:
one or more processors;
system memory; and
one or more computer-readable storage media having stored thereon computer-executable instructions that are executable by the one or more processors to cause the computer system to perform a method for determining latency in an interactive application, the method comprising the following:
an act of accessing an indication indicating that an interactive application input has occurred, the indication including an identifier;
an act of determining that an output has been generated by the interactive application and that the generated output was generated after accessing the indication;
an act of generating a correlating output that correlates the identifier included in the indication with the generated output, the correlating output including the generated output and a second indication of the identified interactive application input;
an act of sending the correlating output to a specified entity, wherein at least a portion of the correlating output and a numerical measurement of a calculated amount of latency will be displayed on a display of the specified entity, the portion of the correlating output and the numerical measurement of the calculated amount of latency being displayed simultaneously with each other; and
an act of receiving an adjustment, during a runtime of the interactive application, regarding how much latency detail is to be acquired between the occurrence of the interactive application input and the sending of the correlating output, whereby the method enables a runtime configuration of a verbosity level that alters how much latency detail is acquired.

18. The computer system of claim 17, wherein generating the correlating output comprises tagging the generated output with a timestamp.

19. The computer system of claim 17, wherein the generated output comprises an encoded frame, and wherein the encoded frame is sent to a decoder for decoding.

20. The computer system of claim 17, wherein generating the correlating output comprises tracking consumption of the accessed indication as the accessed indication is processed at the computer system.

21. The computer system of claim 17, wherein the generated output comprises a preliminary output that receives subsequent processing before being sent to the specified entity.

22. A computer program product for implementing a method for determining latency in an interactive gaming application, the computer program product comprising one or more computer-readable storage media having stored thereon computer-executable instructions that are executable by one or more processors of a computing system to cause the computing system to perform the method, the method comprising:
an act of accessing an indication indicating that an interactive gaming application input has occurred, the indication including an identifier;
an act of determining that a frame corresponding to a video game has been generated by the interactive gaming application and that the frame was generated after accessing the indication;
an act of generating a correlating output that correlates the frame with the identifier included in the indication, the correlating output including the frame and a second indication of the interactive gaming application input;
an act of sending the correlating output to a specified entity, wherein at least a portion of the frame and a numerical measurement of a calculated amount of latency will be displayed on a display of the specified entity, the portion of the frame and the numerical measurement of the calculated amount of latency being displayed simultaneously with each other; and
an act of receiving an adjustment, during a runtime of the interactive gaming application, regarding how much latency detail is to be acquired between the occurrence of the interactive gaming application input and the sending of the correlating output, whereby the method enables a runtime configuration of a verbosity level that alters how much latency detail is acquired.

23. The computer program product of claim 22, wherein the frame includes at least a portion of video game content that is a causal result of the interactive gaming application input.

24. The computer program product of claim 22, the method further comprising an act of generating telemetry data that is transmitted in conjunction with the correlating output.

25. A method, implemented by a computer system that includes one or more processors, for determining latency between an input to and an output from an interactive application, the method comprising:
generating, at a first computing system, an indication that at least one input has been triggered, the generated indication including an identification of the at least one input;
sending the generated indication for the at least one input to an interactive application hosted at a second computing system;
in response to the generated indication sent from the first computing system, generating, at the interactive application hosted at the second computing system, an output that is correlated to the at least one input identified in the generated indication;
receiving, at the first computing system, the correlated output from the interactive application;
determining an amount of latency between the sending of the generated indication to the interactive application and the receiving of the correlated output at the first computing system, wherein both a numerical measurement of the amount of latency and at least a portion of the correlated output will be displayed on a display of the first computing system, the numerical measurement of the amount of latency and the portion of the correlated output being displayed simultaneously with each other;
repeating the above for one or more other indications of inputs sent by the first computing system to the interactive application to determine latency between each generated indication of an input sent to the interactive application and each correlated output returned by the interactive application to the first computing system;

incorporating the latency determinations into data used for analysis so that sources of latency which occur when using the interactive application are identifiable so they can be reduced when possible; and receiving an adjustment, during a runtime of the interactive application, how much latency detail is to be acquired between the sending of the generated indication and the receiving of the correlated output, whereby the method enables a runtime configuration of a verbosity level that alters how much latency detail is acquired.

* * * * *